Figure 1:
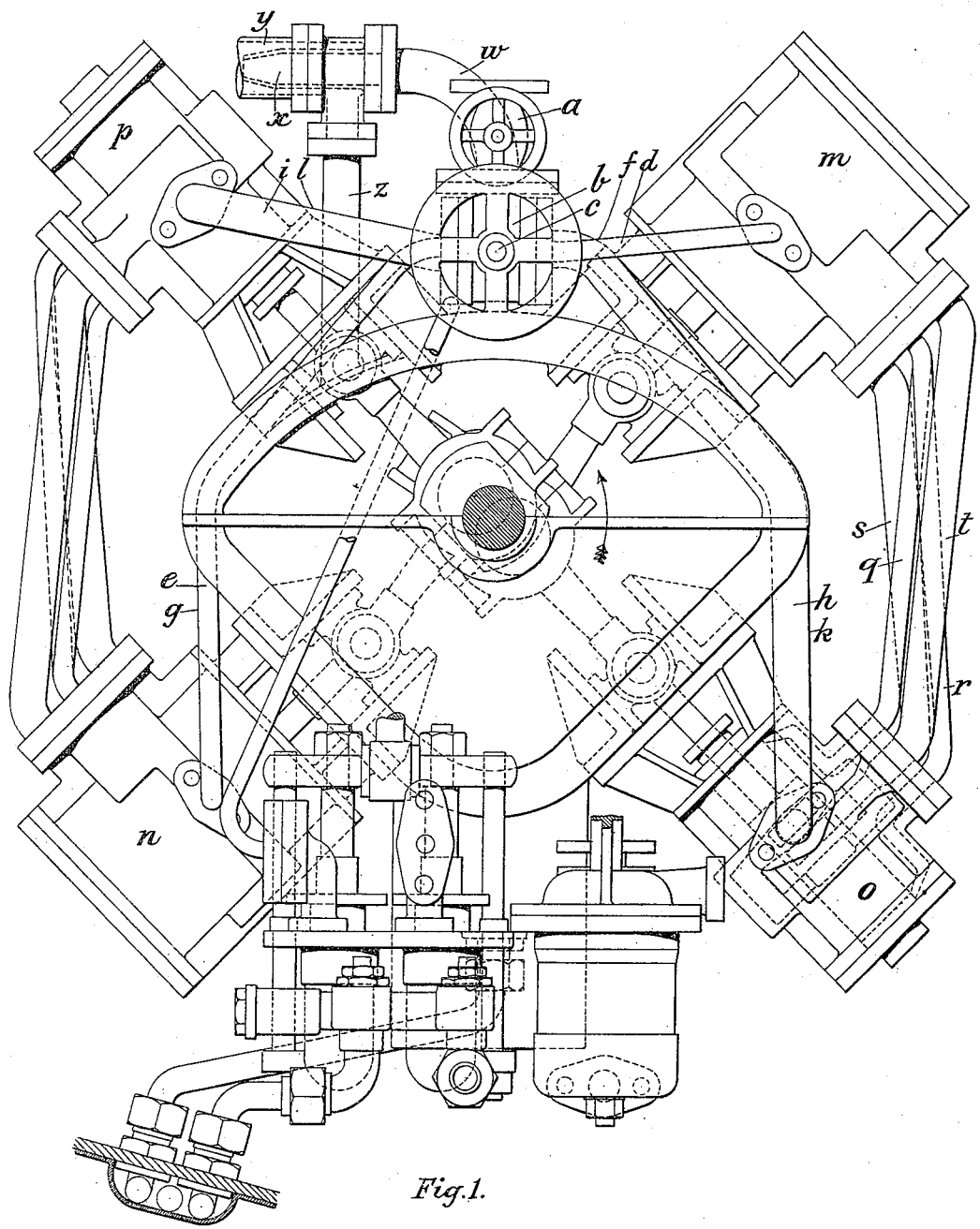

No. 654,127. Patented July 24, 1900.
T. C. BILLETOP.
HIGH SPEED ENGINE.
(Application filed Oct. 31, 1899.)

(No Model.) 9 Sheets—Sheet 1.

WITNESSES:

INVENTOR
Torben Christian Billetop
BY
Richardson
ATTORNEYS

THE NORRIS PETERS CO., PHOTO-LITHO., WASHINGTON, D. C.

No. 654,127. Patented July 24, 1900.
T. C. BILLETOP.
HIGH SPEED ENGINE.
(Application filed Oct. 31, 1899.)

(No Model.) 9 Sheets—Sheet 2.

WITNESSES:

INVENTOR
Torben Christian Billetop
BY
ATTORNEYS

No. 654,127. Patented July 24, 1900.
T. C. BILLETOP.
HIGH SPEED ENGINE.
(Application filed Oct. 31, 1899.)

(No Model.) 9 Sheets—Sheet 3.

WITNESSES:
INVENTOR
Torben Christian Billetop
BY
ATTORNEYS

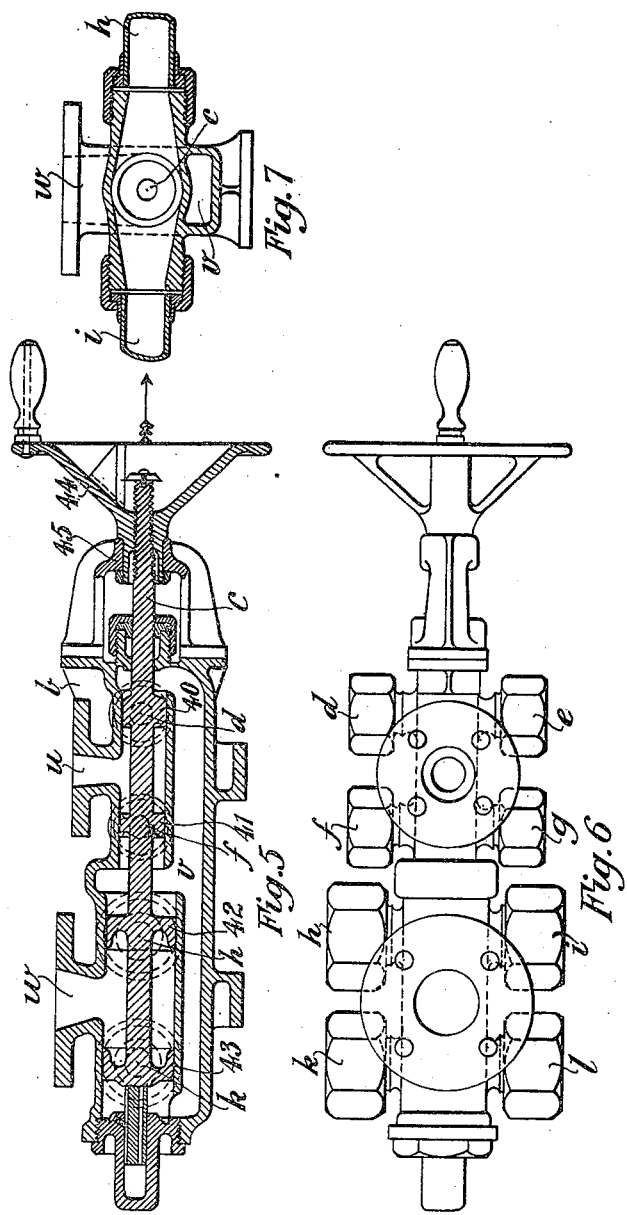

No. 654,127. Patented July 24, 1900.
T. C. BILLETOP.
HIGH SPEED ENGINE.
(Application filed Oct. 31, 1899.)

(No Model.) 9 Sheets—Sheet 5.

WITNESSES:

INVENTOR
Torben Christian Billetop
BY
ATTORNEYS

No. 654,127. Patented July 24, 1900.
T. C. BILLETOP.
HIGH SPEED ENGINE.
(Application filed Oct. 31, 1899.)

(No Model.) 9 Sheets—Sheet 6.

WITNESSES:
Ella L. Giles

INVENTOR
Torben Christian Billetop
BY
Richards
ATTORNEYS

No. 654,127. Patented July 24, 1900.
T. C. BILLETOP.
HIGH SPEED ENGINE.
(Application filed Oct. 31, 1899.)
(No Model.) 9 Sheets—Sheet 7.
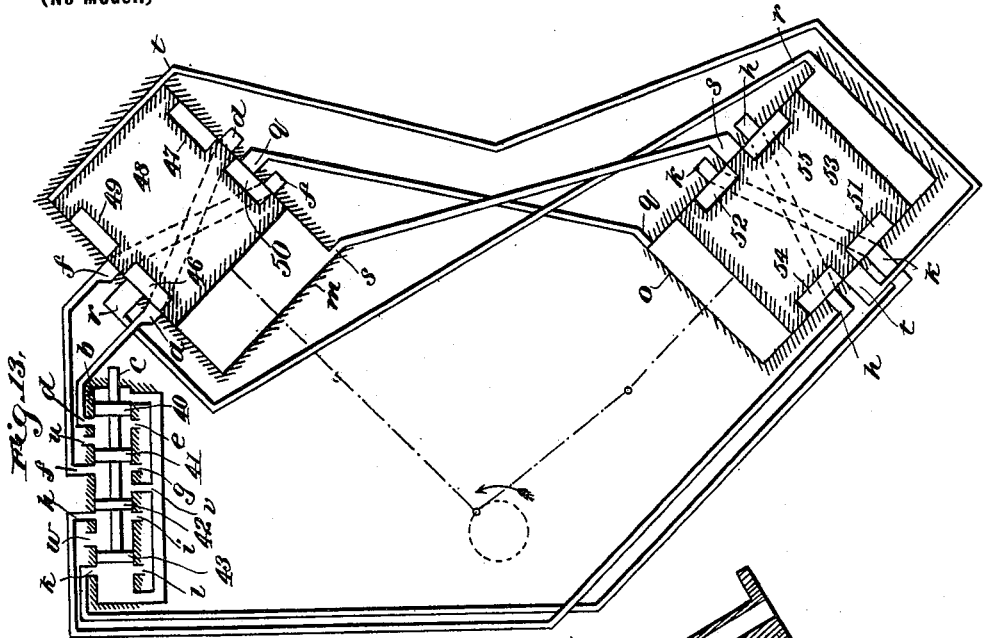
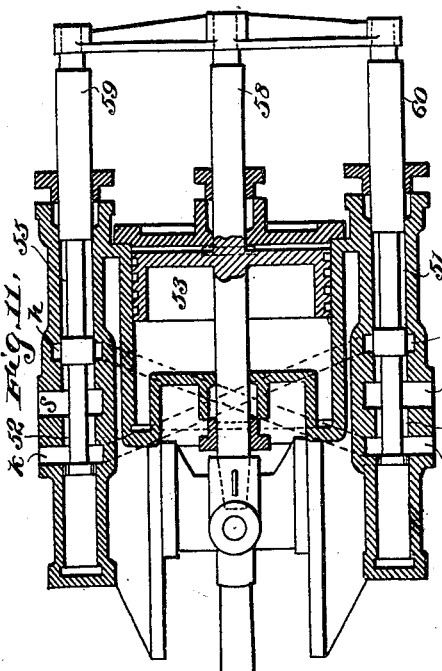
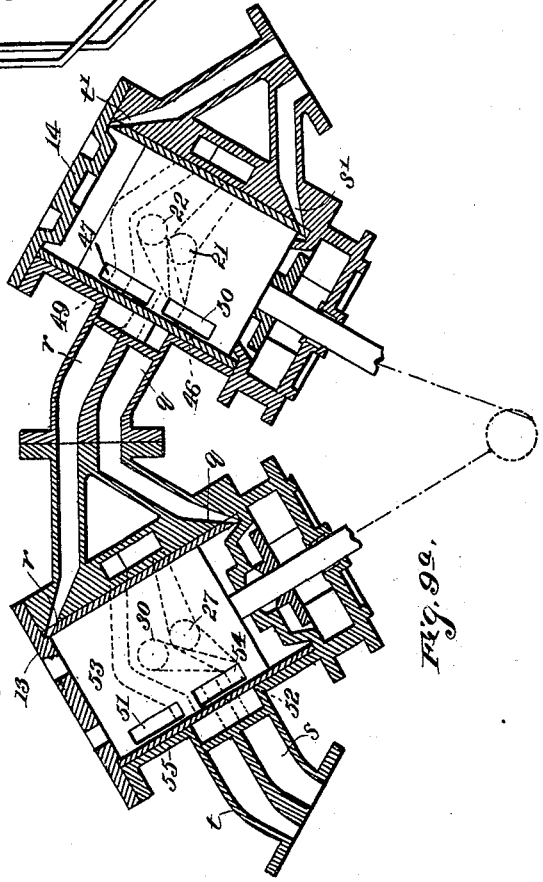
Witnesses:
Inventor:
Torben Christian Billetop
by Richards & Co.
Att'ys No. 654,127. Patented July 24, 1900.
T. C. BILLETOP.
HIGH SPEED ENGINE.
(Application filed Oct. 31, 1899.)

(No Model.) 9 Sheets—Sheet 8.

WITNESSES:
Ella L. Giles

INVENTOR
Torben Christian Billetop
BY
Richardson
ATTORNEYS

No. 654,127.

T. C. BILLETOP.
HIGH SPEED ENGINE.
(Application filed Oct. 31, 1899.)

Patented July 24, 1900.

(No Model.)

9 Sheets—Sheet 9.

WITNESSES:
Ella L. Giles

INVENTOR
Torben Christian Billetop
BY
ATTORNEYS

UNITED STATES PATENT OFFICE.

TORBEN CHRISTIAN BILLETOP, OF NEWCASTLE-UPON-TYNE, ENGLAND, ASSIGNOR OF TWO-THIRDS TO HENRY BURNETT WATSON AND JOHN STANLEY WATSON, OF SAME PLACE.

HIGH-SPEED ENGINE.

SPECIFICATION forming part of Letters Patent No. 654,127, dated July 24, 1900.

Application filed October 31, 1899. Serial No. 735,388. (No model.)

*To all whom it may concern:*

Be it known that I, TORBEN CHRISTIAN BILLETOP, engineer, a subject of the Queen of Great Britain and Ireland, residing at High Bridge Works, Newcastle-upon-Tyne, in the county of Northumberland, England, have invented certain new and useful Improvements in High-Speed Motive-Power Engines and in Auxiliary Connections for the Same, (for which I have made application for Letters Patent in Great Britain, No. 7,735, dated the 12th day of April, 1899,) of which the following is a specification.

This invention relates to improvements in the type of high-speed motive-power engines in which four cylinders are placed radially around a crank-shaft having crank-centers placed at one hundred and eighty degrees to each other, and in which engines the cylinders and their pistons are so constructed that each cylinder and piston acts as a valve for the cylinder next adjacent thereto, the two pistons being connected to the same crank-center in order to give the necessary lead to the valve-piston. The improvements are equally applied to the modified form of this type of engine in which the pistons are of ordinary constructions and separate valves are added in pairs worked by a tail-rod from the piston, the lead of the valve being obtained by coupling the two adjacent pistons to one crank-center, as above mentioned.

My improvements consist, first, of a steam-controlling valve by the operation of which the engine is either run in a forward or backward direction or stopped, as required, the valve being equally applicable to simple, compound, or multiple-expansion engines; secondly, in arranging the type of engine referred to so that the steam passes from one cylinder to the next, thus converting the engine to a compound or triple-expansion engine; thirdly, in arranging an engine having six cylinders, each of which acts as valve for another for compound or multiple-expansion working, placed radially about a crank-shaft having the crank-centers at one hundred and eighty degrees to each other, the pistons being connected alternately to one or other of the crank-centers, thus giving a lead to the valve which permits of the steam being cut off before the end of the piston-stroke; fourthly, in arranging cylinders side by side, with crank-centers placed at ninety degrees to each other, such cylinders acting as valves to each other and having a similar pair of cylinders placed oppositely for purposes of balancing, and, fifthly, in providing a fan or the like worked from the main shaft and arranged to ventilate the closed-in crank-chamber of an engine of the above-mentioned types.

The object of my improvements is to provide a high-speed well-balanced engine capable of running for long periods, and particularly suitable for driving yachts, motor-cars, and auxiliary machinery—such as fans, dynamos, air-compressors, and the like—where a closed-in compact engine is desired.

In order that my invention may be more readily understood, I have appended drawings illustrative of the more convenient methods of construction, in which—

Figure 2:
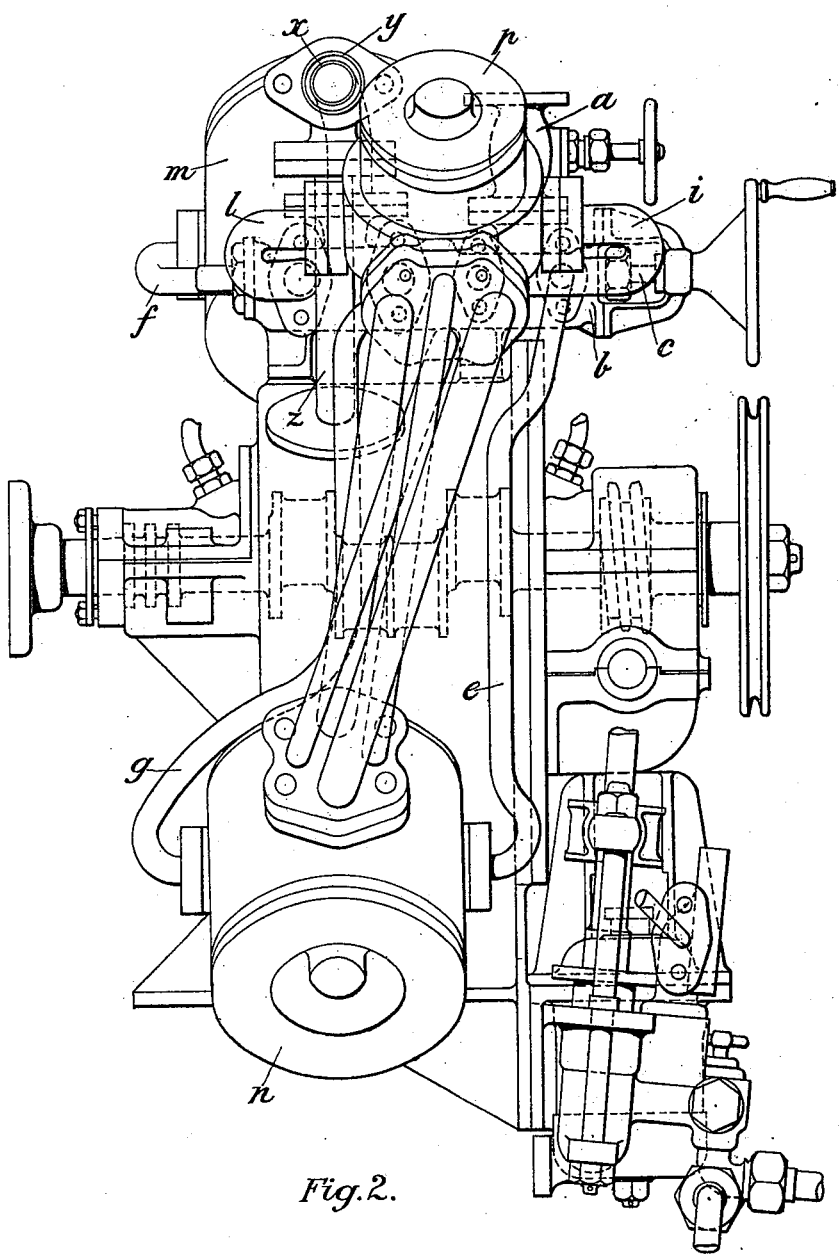
Figure 3:
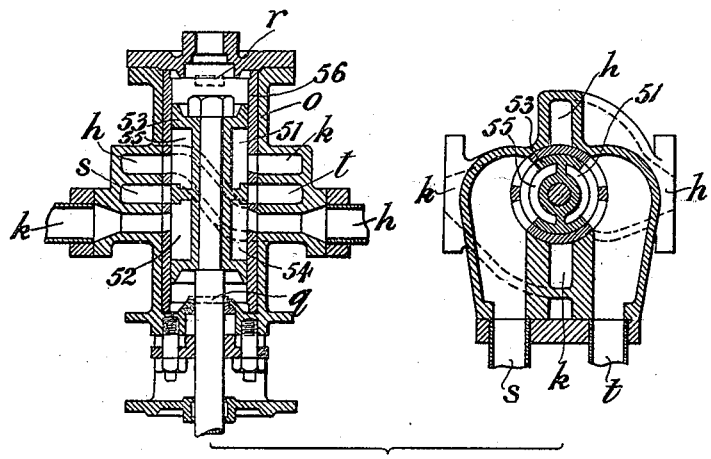
Figure 4:
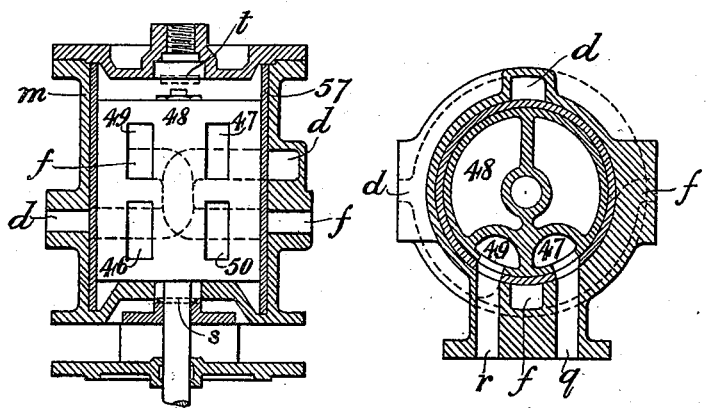
Figure 8:
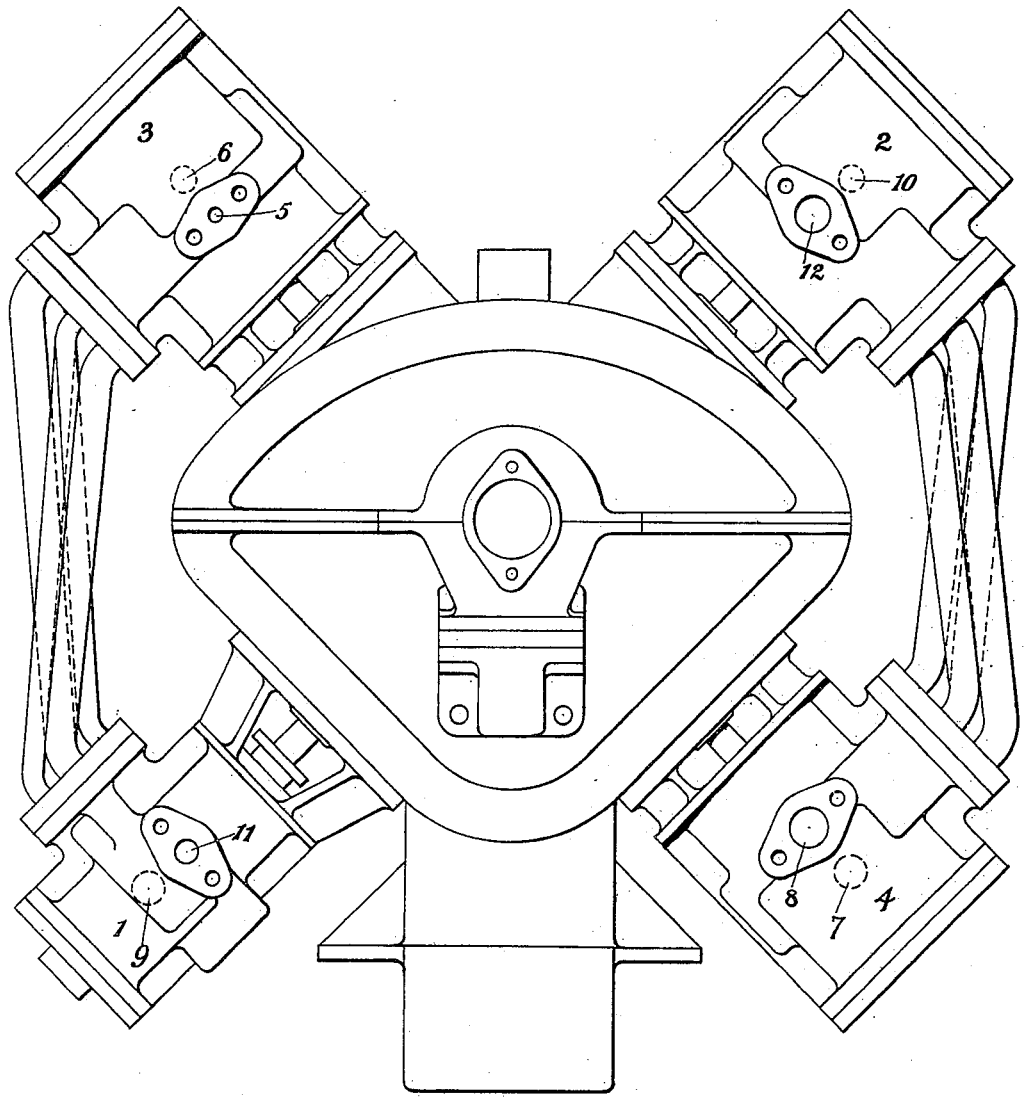
Figure 9:
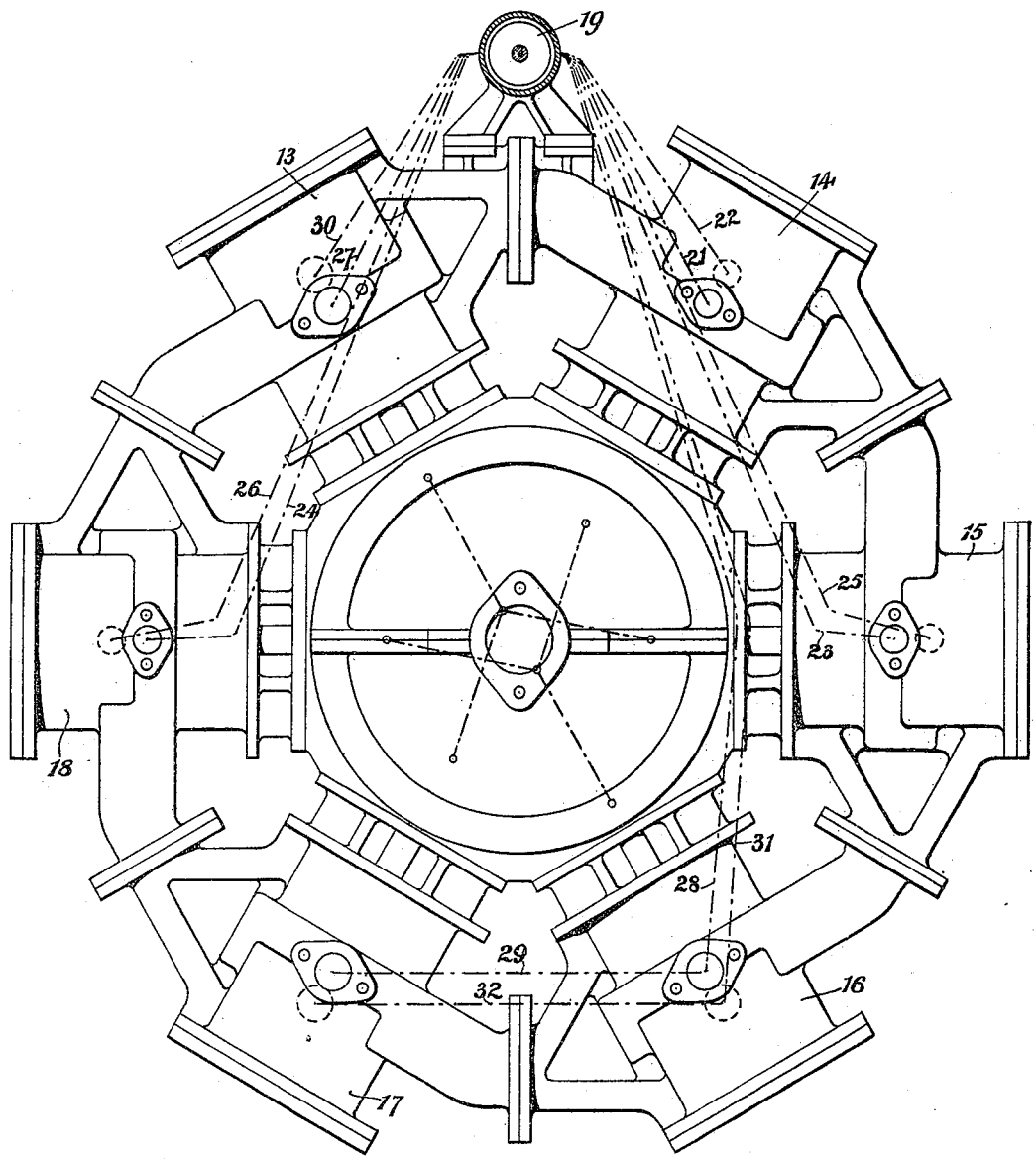
Figure 10:
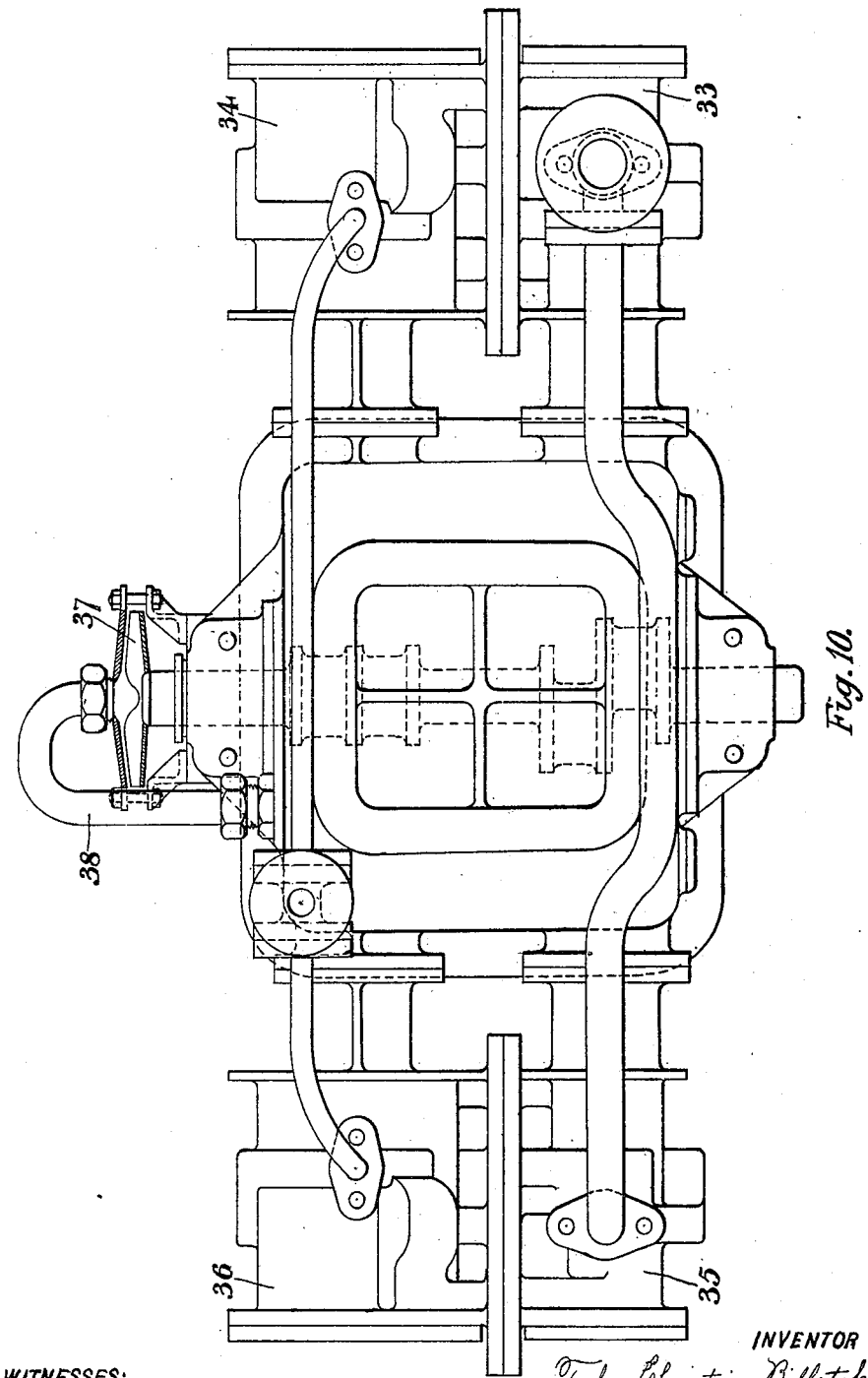
Figure 14:
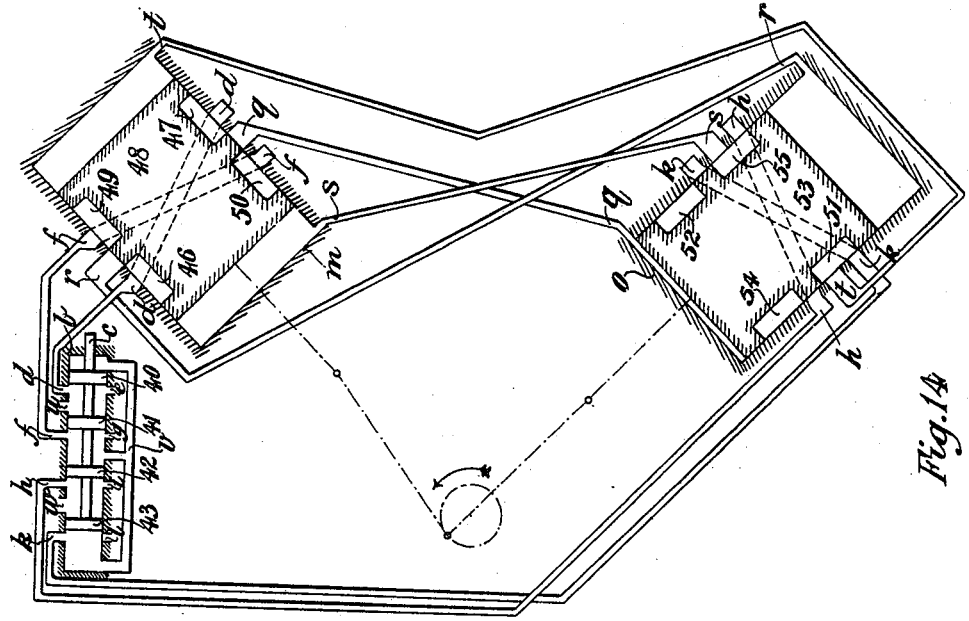
Figure 12:
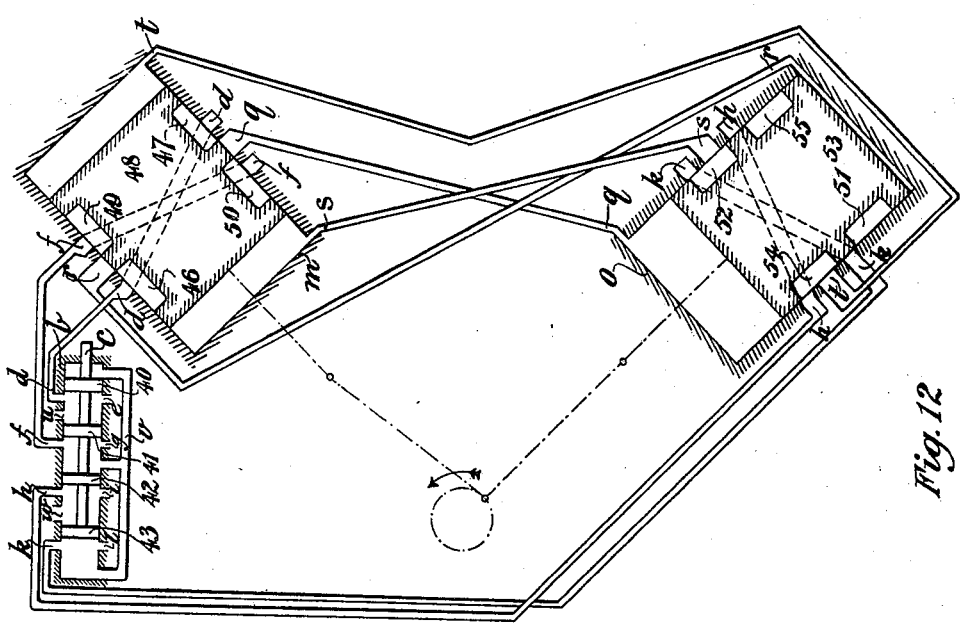

Figure 1 is an elevation, partly in section and with part of the cover-plate removed, of one form of my engine having cylinders arranged radially about the crank-shaft and proportioned for compound working. Fig. 2 is a side elevation of Fig. 1, showing the positions of the cylinders. Figs. 3 and 4 are sections through the high and low pressure cylinders, respectively, showing the steam-ports and pipe connections. Figs. 5, 6, and 7 are sections and plan of my improved controlling-valve. Fig. 8 is an elevation of a four-cylinder engine arranged for triple-expansive working. Fig. 9 is an elevation of a six-cylinder engine arranged for triple-expansive working, with steam cut off before the end of the piston-stroke. Fig. 9$^a$ is a section through two of the cylinders in Fig. 9 and shows the steam-ports and connections. Fig. 10 is a plan of an engine constructed according to the fourth part of my invention. Fig. 11 shows an engine constructed with tail-rods to each piston, arranged to operate slide-valves in duplicate which control the adjacent cylinder. Figs. 12, 13, and 14 are diagrammatic views of the cylinders, pistons, and valves and are typical of the action of all the modifications of my invention to be described.

I will first describe the action of my controlling-valve. (Illustrated by Figs. 5, 6, and 7.) The valve consists of a main casting $b$, bored through and arranged to receive a piston-rod $c$, carrying a series of pistons 40 41 42 43, arranged to fit the bore of the valve-casting and cover up suitably-disposed ports $d\ e\ f\ g\ h\ i\ k\ l$, leading to the cylinders of the engine. A steam-port $u$ is provided which supplies the high-pressure steam, and an exhaust-port $w$ serves to convey the steam to atmosphere or to a condenser, as desired. A side passage or port $v$ permits communication between the ports $d\ e$ and $h\ i$ or the ports $f\ g$ and $k\ l$ at such times as required, such communication being controlled by the movement of the piston-rod $c$. The end of the piston-rod $c$ is screwed and passes through the female-threaded boss of the hand-wheel 44, which revolves freely in the bush 45, formed upon the end of the valve-body. By revolving the hand-wheel 44 the piston-rod $c$ is reciprocated, thus causing the pistons 40 41 42 43 to uncover the ports $d\ e\ f\ g\ h\ i\ k\ l$ and allow steam to pass through the engine-cylinders in a manner to be described. When the hand-wheel is revolved to move the piston-rod $c$ in the direction of the arrow, Fig. 5, the ports $d\ e$ are opened to the steam entering at the port $u$ and act as steam-inlet ports to the pistons of the low-pressure cylinders $m\ n$, Fig. 1, which act as valves to the high-pressure cylinders $o\ p$, respectively, in a manner to be described. After operating upon the high-pressure pistons of the cylinders $o\ p$ the steam is returned through the pistons of the low-pressure cylinders $m\ n$, respectively, to the ports $f\ g$. From the ports $f\ g$ the steam passes through the side passage or port $v$ to the ports $k\ l$, which communicate with the pistons of the high-pressure cylinders $o\ p$, respectively, such pistons acting as valves to the low-pressure cylinders $m\ n$, respectively, in a manner to be described. After operating the low-pressure pistons of the cylinders $m\ n$ the steam is returned by way of the high-pressure pistons $o\ p$, respectively, to the ports $h\ i$, which are in communication with the exhaust-port $w$. If the hand-wheel 44 be now revolved in a direction to reciprocate the piston-rod $c$ in a reverse direction to the arrow, Fig. 5, the piston 41 will uncover the ports $f\ g$ to the steam-supply entering at $u$ and cause the engine to revolve in an opposite direction, owing to the construction of the valves formed in the pistons $m\ n$ and acting as valves for the cylinders $o\ p$, respectively. The ports $d\ e$ in this case are open to the side passage $v$ and communicate with the ports $h\ i$, supplying steam to operate the low-pressure cylinders $m\ n$. The steam returned from the low-pressure cylinders is exhausted by the ports $k\ l$, which communicate with the exhaust-port $w$.

When arranging my controlling-valve for use with a triple-expansion engine in which the piston of one cylinder acts as valve for another cylinder—such, for instance, as the engines illustrated in Figs. 8 and 9—the piston-rod $c$ has six pistons formed thereon and arranged to cover ports arranged in three series in place of the two series 40 41 and 42 43, (shown in Fig. 5,) and the exhaust-port $w$, Fig. 5, is arranged to act as side passage or port leading to the third series, and an additional port is provided on the third series to act as permanent exhaust. By continuing the series of pistons a valve may be constructed to control cylinders working with any number of expansions. The arrangement of the cylinders, pistons, ports, and valves by which one cylinder and its piston are caused to control the steam-supply to an adjacent cylinder will be best understood by a description of the diagrammatic views, Figs. 12, 13, and 14.

Fig. 12 is a diagrammatic view of the cylinders $m\ o$ in Fig. 1 and the controlling-valve, Fig. 5, with the piston-rod $c$ reciprocated in the direction of the arrow, Fig. 5, so as to cause the engine, Fig. 1, to revolve in the direction of the arrow, Fig. 1. The steam enters the valve $b$ through the port $u$ and then passes by the port $d$ to the cylinder $m$. The port $d$ has two openings in cylinder $m$, having communication at proper times with the ports 46 47, formed within the piston 48, within the cylinder $m$. In the same way the port $f$, leading from the valve $b$, has communication at proper times with the two ports 49 50, formed within the piston 48. Two ports $q\ r$ are formed within the body of the cylinder $m$ and communicate with the two ends of the cylinder $o$, as shown. These ports $f\ d\ q\ r$ 46 47 49 50 serve to control the steam-supply to the high-pressure cylinder $o$, and according to the position of the piston-rod $c$ to admit steam entering at $d$ or $f$, respectively, causing the engine to run in a forward or backward direction. If the steam enters through the port $d$, as shown, the exhaust takes place through the port $f$, and vice versa. The exhaust from the high-pressure cylinder $o$, passing by way of the port $f$ or $d$, is discharged into the side passage $v$ to enter the port $k$ or $h$, according to the position of the piston-rod $c$. In the diagram Fig. 12 the steam is exhausted through $f$ and enters the port $k$, which has communication at proper times with the ports 51 52, formed in the piston 53 in the cylinder $o$. Similarly the port $h$, leading from the valve $b$, has communication at proper times with the two ports 54 55, formed within the piston 53. Ports $s\ t$, formed within the body of the cylinder $o$, communicate with the two ends of the cylinder $m$. These ports $h\ k\ s\ t$ 51 52 54 55 serve to control the steam-supply to the low-pressure cylinder $m$, and according to the position of the piston-rod $c$ to admit steam entering at $k$ or $h$, respectively, causing the engine to run in a forward or backward direction. When the high-pressure steam enters at $d$, the low-pressure steam enters to operate the cylinder $m$ by way of the port $k$ and is exhausted by the port $h$, finally passing away from the valve $b$ by the exhaust-port $w$. The ports $e\ g\ i\ l$ are corresponding ports to $d\ f\ h\ k$ and are connected to the cylinders $n\ p$, Fig. 1, which are exactly similar in construction to the cylinders $m\ o$. The action is as follows: Assuming the parts to be in the position shown in Fig. 12 and steam to be admitted through the port $u$, the steam will pass along the port $d$ and fill the ports 46 47, and on a slight movement of the crank in the direction of the arrow, Fig. 12, the port 46 opens to the port $r$ by the movement of the piston 48, thus allowing the steam to flow from the port $d$ to the cylinder $o$ by the port $r$ and operate upon the high-pressure piston 53 to drive the engine. The movement of the piston 48 also causes communication to be established between the ports $q\ f$ by the port 50, thus allowing the steam in the cylinder $o$ which has already operated upon the piston 53 to escape by way of the ports $q$ 50 $f$ to the side passage $v$ which is in communication with the port $k$, which communicates by the port 52 with the port $s$, which in turn communicates with the cylinder $m$, and the low-pressure steam thus entering serves to operate upon the low-pressure piston 48. The port $h$, which is in communication by the port 54 with the port $t$, leading to the cylinder $m$, allows the steam which has already operated upon the piston 48 to escape to exhaust by the port $w$. When the crank has traveled through ninety degrees of angle, the position of the parts is shown by Fig. 13. The piston 48 has now reached the end of its stroke, and the ports $k$ and $h$ are closed to the ports $s\ t$. The piston 53 is near half-stroke, and the ports $d\ f$ are still open to the ports $r\ q$. A slight further movement of the crank causes the port $t$ to communicate with the port $k$ by the port 51, thus supplying low-pressure steam from the side passage $v$ to the low-pressure cylinder $m$ to drive out the piston 48. At the same time the port $s$ communicates with the port $h$ by the port 55 and allows the steam which has already operated upon the piston 48 to escape to exhaust. When the crank has revolved through a further angle of ninety degrees, the position of the parts is represented by Fig. 14. The piston 53 having reached the end of its stroke, the steam supply and exhaust are cut off by the piston 48, which is near half-stroke, thus closing communication between the ports $d\ r$ and $f\ q$. The piston 48 is still on its outward stroke, and the port $k$ supplying steam is still open to the port $t$, and the port $h$ in communication with the exhaust $w$ is open to the port $s$. A further movement of the crank-shaft causes a continuation of the properly-timed opening and closing of the valves to supply steam to the cylinders and to permit exhaust. When one piston is at the end of a stroke, the other is near the half-stroke, so that the valves are first closed and then opened in an opposite sense, so that where live steam was admitted free opening is afforded to exhaust.

The valves or ports in the pistons 48 53 and the cylinders $m\ o$ are shown in the diagrams without lap or lead; but it will be readily understood that these may be added by following the ordinary processes of steam-engine design.

The description already given is for running the engine in one direction only; but it will be understood that by reversing the piston-rod $c$, Fig. 5, so as to open the ports $f\ g$ to the live steam entering at $u$, the engine will run in the opposite direction without further attention or adjustment.

Referring to Figs. 1, 2, 3, 4, 5, 6, and 7, the high-pressure steam is admitted to the engine by way of the stop-valve $a$ and controlling-valve $b$, the position of the valve $b$ determining in which direction the engine shall run. The valve $b$ is provided with a stalk $c$, having pistons formed thereon, as already described, which either close up or open steam-ports $d\ e\ f\ g\ h\ i\ k\ l$, leading in pairs to the cylinders $m\ n\ o\ p$. The pipes $f\ g\ k\ l$ lie behind the pipes $d\ e\ h\ i$ and are hidden from view thereby in Fig. 1. The cylinders and pistons are arranged with suitable ports in duplicate, so that each cylinder and its piston may act as valve for the next adjacent cylinder. The cylinder $m$ thus controls the cylinder $o$, and the cylinder $o$ controls the cylinder $m$, and in the same way the cylinders $n$ and $p$ control each other. When the engine is running in the direction of the arrow, Fig. 1, the pipes $d\ e\ k\ l$ serve to convey the steam to the cylinders, while the pipes $f\ g\ h\ i$ serve as exhaust-pipes, as described with reference to Figs. 12, 13, and 14. When the engine is caused to run in an opposite direction, by manipulating the valve $b$ the pipes $f\ g\ h\ i$ become steam-pipes and $d\ e\ k\ l$ exhaust-pipes. I will assume, as an example, that the valve $b$ has been operated by the hand-wheel, causing the piston-valve to be moved in the direction of the arrow, Fig. 5, thus opening the ports $d\ e$ to the high-pressure steam entering at $u$, the ports $f\ g$ acting in this case as exhaust-ports to the high-pressure cylinders $o\ p$ and discharging into the by-pass $v$, leading in this instance to the ports $k\ l$, which act as steam-ports to the low-pressure cylinders $m\ n$, the ports $h\ i$ being connected to the exhaust-pipe $w$. The ports $e\ g\ i\ l$ and cylinders $n\ p$ may be neglected, as they are an exact replica of the ports $d\ f\ h\ k$ and cylinders $m\ o$. As shown in Fig. 1, the piston in the cylinder $m$ is at half-stroke, so that on the crank-shaft revolving in the direction of the arrow the port $d$, carrying high-pressure steam, communicates with the port $r$, leading to the cylinder $o$, and thus driving out the high-pressure piston. The exhaust-steam from the front of the high-pressure piston passes out through the port $q$ in communication with the port $f$, which is open to the by-pass $v$, leading to the ports $k\ l$. From the port $k$ the steam passes by way of the high-pressure piston to the port $s$, leading to the low-pressure cylinder $m$. When the crank has revolved through ninety degrees, the port k will be closed to the port s by the high-pressure piston, thus cutting off the steam-supply to the piston of the low-pressure cylinder m, which has reached the end of its stroke. At the same time communication is established between the ports h and t, thus leading the steam to the opposite end of the cylinder m. A further movement of the crank through ninety degrees places the low-pressure piston on half-stroke, thus closing the port r to the port d and cutting off the steam from the cylinder o, the piston having reached the end of its stroke. At the same time the port d communicates with the port q by way of the spiral passage formed on the cylinder m, thus admitting steam to the opposite end of the cylinder o. The exhaust-steam from the cylinder m passes by way of the ports s t through the high-pressure piston to the port h, leading to the exhaust-pipe w, the port h being open to the ports s t at such times as they are closed to the port k. In the same manner steam is conducted to the cylinders n p, which operate in the same way as the cylinders m o to form a compound engine.

Figs. 3 and 4 show sections of the cylinders o m as actually constructed and are applicable to the designs of engine illustrated by Figs. 1, 2, and 8 without modification and to the types illustrated by Figs. 9 and 10 with modifications in detail. Fig. 3 shows longitudinal and transverse sections of the cylinder o, Fig. 1. The cylinder-casting is formed with two ports h k, each of which communicates with the bore of the cylinder by two openings. The piston 53 is provided with four ports 51 52 54 55, as shown. Two of these ports 51 52 are in communication with the openings of the port k and at proper times with the ports s t, formed within the cylinder-casting and having communication with the ports s t in the cylinder m, as described, and clearly shown in the diagrams, Figs. 12, 13, and 14. The remaining two ports 54 55 are in communication with the two openings of the port h and at proper times with the ports s t, formed within the cylinder-casting and having communication with the ports s t in the cylinder m, as described, and clearly shown in the diagrams, Figs. 12, 13, and 14. Thus the cylinder o and its piston 53, being provided with the suitable ports, are enabled by reason of the reciprocation of the piston within the cylinder covering and uncovering the ports s t to allow admission and exhaust of fluid to perform the function of a slide-valve to the cylinder m, with which the ports s t communicate. For convenience of manufacture a liner 56 is placed within the cylinder o. Fig. 4 shows longitudinal and transverse sections of the cylinder m, Fig. 1. The cylinder-casting is formed with two ports d f, each of which communicates with the cylinder-bore by two openings coinciding in position with the ports 46 47 49 50, formed within the piston 48. The two ports 46 47 are in communication with the openings of the port d and at proper times with the ports q r, formed within the cylinder-casting and having communication with the ports q r in the cylinder o, as described, and clearly shown in the diagrams, Figs. 12, 13, and 14. The remaining two ports 49 50 are in communication with the openings of the port f and at proper times with the ports q r, formed within the cylinder-casting and having communication with the ports q r in the cylinder o, as described, and clearly shown in the diagrams, Figs. 12, 13, and 14. Thus the cylinder m and its piston 48, being provided with suitable ports, are enabled by reason of the reciprocation of the piston within the cylinder covering and uncovering the ports s t to allow admission and exhaust of fluid to perform the function of a slide-valve to the cylinder o, with which the ports q r communicate. For convenience of manufacture a liner 57 is placed within the cylinder m.

Fig. 8 shows an engine similar to the above in general arrangement, but arranged for triple-expansion working. In this engine the cylinder 1 is the high-pressure cylinder, while cylinder 2 is the intermediate-pressure and the two cylinders 3 4, each of equal capacity to cylinder 2, are the low-pressure cylinders. To effect a balance of the moving parts, the piston of cylinder 1 is made of equal weight with that of cylinder 2. The pistons are connected in pairs to crank-centers placed at one hundred and eighty degrees to each other, as in Fig. 1. A valve is fitted to the engine of similar designs to that shown in Figs. 5, 6, and 7, but having its piston-valve c provided with six pistons arranged in three series, as previously described, to cover eight ports, two of which lead to each cylinder. The exhaust-opening w is in this case transformed into a by-pass similar to v and leading to the additional pistons. In this valve the ports, such as e j i l, are not required, as the high and intermediate pressure cylinders are not duplicated. The cylinder 1 is constructed as shown in Fig. 3, and the cylinders 2 3 4 are constructed as shown in Fig. 4. The steam from the controlling-valve enters cylinder 3, which acts as valve to cylinder 1, by the port 5 and having operated on the piston of cylinder 1 is exhausted through the port 6 to the controlling-valve to pass on to the port 7 in cylinder 4, which acts as valve to cylinder 2. Having operated cylinder 2, the steam is exhausted by port 8 to again pass through the controlling-valve to the ports 9 10 on cylinders 1 2, which cylinders act as valves to cylinders 3 4, respectively. The steam exhausted from cylinders 3 4 passes by way of ports 11 12 through the controlling-valve to the exhaust-pipe. When the controlling-valve is operated to reverse the engine, the ports which are mentioned in the above description as steam-ports become exhaust-ports, and vice versa.

Fig. 9 shows a design of six-cylinder triple-expansion engine constructed according to my invention and having one high-pressure cylinder and two intermediate and three low pressure cylinders. The cylinders and pistons are of similar dimensions, and the pistons are connected alternately to crank-centers arranged at one hundred and eighty degrees to each other, thereby securing balance of the moving parts. The cylinder 13 is the high-pressure cylinder and 14 17 are intermediate-pressure and 15 16 18 are low-pressure cylinders. Each cylinder acts as valve to the next, and the respective crank-centers being at one hundred and eighty degrees to each other the valve is given an advance of one hundred and twenty degrees, thus securing the necessary lead to cut off steam before the end of the stroke and provide for expansive working in the cylinder. A controlling-valve 19 is provided of similar construction to those already described.

Fig. 9$^a$ is a section of two cylinders of the engine illustrated in Fig. 9 and shows the ports in the cylinder casting and piston, which are similar to those shown in Fig. 4, but modified in detail to suit the particular circumstances. The action will be readily understood by reference to the diagrams Figs. 12, 13, and 14. The ports 21 22 in the cylinder 14 correspond to the ports $f\ d$, respectively, and have communication with ports formed within the piston. Each piston has four ports and is in every respect similar to the piston 48 in Fig. 4. In Fig. 9$^a$ two only of these ports, as 50 47, are visible. The remaining two 46 49 are behind these. The port 22 has communication with the ports 46 47 and at proper times with the ports $q\ r$, leading to the cylinder 13. The port 21 has communication with the ports 50 49 and at proper times with the ports $q\ r$, leading to the cylinder 13. By reason of the reciprocation of the piston the fluid is supplied to or exhausted from the cylinder 13 precisely as described with reference to the diagrams Figs. 12, 13, and 14. The axes of the pistons being placed at one hundred and twenty degrees to each other and the crank-centers being at one hundred and eighty degrees to each other, as shown, the one piston is given an angle of advance of one hundred and twenty degrees over the piston to which it acts as valve. By providing a suitable amount of lap to the valves in the usual manner cut off of fluid before the end of the stroke is provided for. When the engine is running in one direction, steam passes from the valve 19 by the pipe 21 through the valve-piston of cylinder 14 to cylinder 13. From 13 the steam is exhausted by the pipe 22 and passing through the valve 19 enters the pipes 23 24 and passing through the valve-pistons 15 18 operates on the intermediate pressure-pistons 14 17. The steam returns by the pipe 25 26 to the valve 19 to pass on by the pipes 27 28 29 to the valve-pistons of 13 16 17 to operate upon the low-pressure pistons 18 15 16 and from these to be returned by way of the pipes 30 31 32 through the valve 19 to the exhaust. On operating the controlling-valve 19 to reverse the engine the pipes which have conveyed steam to the cylinders in the above description become exhaust-pipes, and vice versa.

Fig. 10 illustrates an engine constructed according to the fourth part of my invention, in which the cylinders are arranged in pairs side by side and having crank-centers at ninety degrees to each other, such cylinders and pistons acting as valves to each other and having a similar pair of cylinders placed oppositely for the purposes of balancing. Two pairs of cylinders 33 34 and 35 36 are provided for compound working. The low-pressure cylinders 34 36 act as valves for their respective high-pressure cylinders 33 35 and the high-pressure cylinders act as valves to the low-pressure cylinders. Four crank-centers are provided, placed in one-hundred-and-eighty-degree pairs at ninety degrees to each other. By this arrangement each cylinder, such as 33, is opposed to a similar cylinder, such as 35, having their crank-centers at one hundred and eighty degrees to each other for purposes of balance, while each pair, such as 33 34, have a lead of ninety degrees, giving the necessary cut-off. The internal construction of the cylinder is generally similar to those already described, as illustrated in Figs. 3 and 4, and for purposes of reversing and control the valve $b$ may be used.

It will be readily understood that without departing from my invention any of the engines described having one cylinder acting as valve for another may in place of such arrangement have a tail-rod continued through the cylinder or similar device arranged to operate slide-valves in duplicate for the purpose of regulating the supply and cut-off of the steam or other fluid. Fig. 11 illustrates this modification of my invention. The piston 53 is provided with a tail-rod 58, which is arranged to operate two valve-pistons 59 60. Ports $h\ k$ are provided for the supply or exhaust of fluid, and each of such ports has communication with both the valves 59 60 by means of the spiral passages shown. Ports $s\ t$ are provided one to each valve and having communication with another cylinder of the engine. Each valve 59 60 has two ports, as 51 54 or 52 55. By reciprocation of the valves 59 60 over the ports, such as $h\ k\ s\ t$, fluid is supplied to and exhausted from an adjacent cylinder, the action being precisely similar to that of the diagrams Figs. 12, 13, and 14. Cylinders and valves of this type may be applied to any of the types of engines shown in Figs. 1, 2, 8, 9, and 10 and may be used with or without a controlling-valve, such as $b$.

The crank-chamber of the engine (illustrated by Fig. 10) is ventilated, according to the fifth part of my invention. A fan, exhauster, or blower 37, driven from the crank-shaft, is employed, having a port or passage 38 communicating with the crank-chamber, through which the heated air is drawn by the fan to be discharged to the atmosphere, smoke-stack, or elsewhere. Suitable openings are provided to admit fresh air to the crank-chamber.

As illustrated in Figs. 1 and 2, an exhaust-steam ejector may be provided for removing the heated air from the crank-chamber, such ejector to be used in place of a fan. The exhaust-steam is discharged through the blast-pipe $x$ into the enlarged duct $y$, thus drawing air through the pipe $z$.

Having thus described my invention, what I claim as new, and desire to secure by Letters Patent, is—

1. A controlling-valve consisting of a piston rod or stalk $c$ which can be reciprocated within the valve-body having a side passage $v$, or passages, to start, stop or reverse an engine, and carries pistons in series, as 40, 41 and 42, 43 or the equivalent arranged to cover or uncover ports, as $d, e, f, g, h, i, k, l$, such valve to be used in combination with the cylinders of a fluid-pressure engine of the type in which one cylinder and its piston as $m$, 48, act as valve to another cylinder, as $o$, by reason of the said piston having ports 46, 47, 49, 50 and reciprocating over ports, $d, f, r, q$ arranged in the cylinder, such piston allowing the admission of fluid to and exhaustion of fluid from, another cylinder, as $o$, which acts in like manner as valve to the one or to another cylinder of the engine for compound or multiple-expansion working such cylinders having their pistons connected to the crank-shaft in such a manner as to give the necessary angle of advance to each piston acting as valve to another cylinder, the whole substantially as described and as illustrated.

2. A controlling-valve consisting of a piston rod or stalk $c$, which can be reciprocated within the valve-body having a side passage or passages to start, stop or reverse an engine and carries pistons in series, or the equivalent, arranged to cover or uncover ports; such valve to be used in combination with the cylinders of a fluid-pressure engine of the type in which each piston carries a tail-rod, or the equivalent, which operates valves in duplicate to control another cylinder; the engine being arranged for compound working and having its pistons connected to the crank-shaft in such a manner as to give the necessary angle of advance to each piston having a tail-rod or its equivalent and valves to control another cylinder, the whole substantially as described and as illustrated.

3. A fluid-pressure engine having two cylinders, as $m, o$, with their pistons connected to one common crank-center, the axes of the cylinders being placed at or about right angles to each other and the pistons provided with ports as 46, 47, 49, 50 and arranged to reciprocate within cylinders having ports as $d, f$, for the supply or exhaust of the fluid, and ports $q, r$, leading to the adjacent cylinder, each of such cylinders and its piston being arranged to act as valve to the adjacent cylinder, the angle of advance of each piston acting as valve to the other cylinder being provided by the disposition of the cylinders in relation to the crank-shaft, the engine being used either with or without the interposition of a controlling-valve, such as $b$, and arranged for the fluid to pass from one cylinder to the other for compound working, the whole substantially as described and as illustrated.

4. A fluid-pressure engine having cylinders placed radially and opposite to each other as $m, n, o, p$ and having their pistons connected in pairs as $m, o$, and $n, p$, to crank-pins arranged at one hundred and eighty degrees to each other, such pistons being of the same or approximately the same weight for balancing the moving parts and provided with ports, such as 46, 47, 49, 50 and arranged to reciprocate within cylinders having ports such as $d, f$, for the supply or exhaust of fluid and ports, such as $q, r$, leading to the adjacent cylinder of the pair connected to the same crank-center, each of such cylinders and its piston being arranged to act as valve to the adjacent cylinder of the pair, the angle of advance of the piston acting as valve to the adjacent cylinder being provided by the disposition of the cylinders in relation to the crank-shaft, such engine being used either with or without the interposition of a controlling-valve, such as $b$, and arranged for the fluid to pass from one cylinder to the other for compound working, the whole substantially as described and as illustrated.

5. A fluid-pressure engine having cylinders placed radially and opposite to each other, as 1, 2, 3, 4, and having their pistons connected in pairs, as 1, 3 and 2, 4 to crank-pins arranged at one hundred and eighty degrees to each other, such pistons being of the same or approximately the same weight for balancing the moving parts and provided with ports such as 46, 47, 49, 50 and arranged to reciprocate within cylinders having ports, such as $d, f$, for the supply or exhaust of steam or other fluid, and ports, such as $q, r$, leading to the adjacent cylinder of the pair connected to the same crank-center, each of such cylinders and its piston being arranged to act as valve to the adjacent cylinder of the pair, the angle of advance of the piston acting as valve to the adjacent cylinder being provided by the disposition of the cylinders in relation to the crank-shaft, such engine being arranged for triple-expansion working by reason of the fluid being passed successively through the cylinders, as in the order 1, 2 and concurrently 3, 4, and further such engine being used either with or without the interposition of a controlling-valve, such as $b$, the whole substantially as described and as illustrated.

6. A fluid-pressure engine having six cylinders placed radially and opposite to each other, as 13, 14, 15, 16, 17, 18, and having their pistons connected alternately as 13, 15, 17, and 14, 16, 18 to two crank-pins arranged at one hundred and eighty degrees to each other, such pistons being of the same or approximately the same weight for balancing the moving parts, and provided with ports, such as 46, 47, 49, 50 and arranged to reciprocate within cylinders having ports, such as $d, f$, for supply or exhaust of fluid and ports, such as $q, r$, leading to the next adjacent cylinder, each of such cylinders and its piston being arranged to act as valve to the adjacent cylinder, the angle of advance of the piston acting as valve to the adjacent cylinder being provided by the disposition of the cylinders in relation to the crank-shaft, such engine being arranged for triple-expansion working with cut-off before the end of the stroke the fluid being passed and expanded successively through the cylinders, as in the order 13 and concurrently 14, 17 and again concurrently 15, 16, 18, and further such engine being used either with or without the interposition of a controlling-valve, such as $b$, the whole substantially as described and as illustrated.

7. A fluid-pressure engine having cylinders side by side in pairs, as 33, 34, and having their pistons connected to crank-centers arranged at ninety degrees to each other, such pistons being provided with ports, such as 46, 47, 49, 50, and arranged to reciprocate within cylinders having ports, such as $d, f$, for the supply or exhaust of fluid and ports, such as $q, r$, leading to the adjacent cylinder, each of such cylinders and its piston being arranged to act as valve to the adjacent cylinder, the angle of advance of each piston acting as valve to the adjacent cylinder being provided by the pistons being connected to crank-centers arranged at ninety degrees to each other, such engine being arranged for compound working by reason of the fluid being passed from one cylinder to the adjacent cylinder, and further such engine being used either with or without the interposition of a controlling-valve, such as $b$, the whole substantially as described and as illustrated.

8. A fluid-pressure engine having cylinders side by side in pairs, as 33, 34, each pair being opposed by a similar pair, as 35, 36, and each pair having its pistons connected to crank-centers at ninety degrees to each other; and the crank-centers being further so disposed that each piston is connected to a crank-center placed at one hundred and eighty degrees to the crank-center of the opposing piston, such opposing pistons, as 33, 35, being of the same or approximately the same weight for the purpose of balancing the moving parts; and such pistons being further provided with ports, as 46, 47, 49, 50, and arranged to reciprocate within cylinders having ports, such as $d, f$, for the supply or exhaust of fluid and ports, such as $q, r$, leading to the adjacent cylinder of the pair, each of such cylinders and its piston being arranged to act as valve to the adjacent cylinder, the angle of advance of the piston acting as valve to the adjacent cylinder being provided by the pistons being connected to the crank-centers arranged at ninety degrees to each other; such engine being arranged for compound working by reason of the fluid being passed from one cylinder to the adjacent cylinder of the pair, as 33 to 34; and further such engine being used either with or without the interposition of a controlling-valve, such as $b$, the whole substantially as described and as illustrated.

9. A fluid-pressure engine having two cylinders with their pistons connected to one common crank-center, the axes of the cylinders being placed at or about right angles to each other and the pistons provided with tail-rods operating valves in duplicate, as 59, 60, having ports, as 51, 54, 52, 55, and arranged to reciprocate over valve-faces having ports, as $h, k$, for the supply or exhaust of the fluid, and ports, as $s, t$, leading to the adjacent cylinder, each of such cylinders with its tail-rod and valves being arranged to act as valve to the adjacent cylinder, the angle of advance of each piston with its tail-rod and valves being provided by the disposition of the cylinders in relation to the crank-shaft, the engine being used either with or without the interposition of a controlling-valve, such as $b$, and arranged for the fluid to pass from one cylinder to the other for compound working, the whole substantially as described and as illustrated.

10. A fluid-pressure engine having cylinders placed radially and opposite to each other, as $m, n, o, p$, and having their pistons connected in pairs, as $m, o$, and $n, p$, to crank-pins arranged at one hundred and eighty degrees to each other, such pistons being of the same or approximately the same weight for balancing the moving parts and provided with tail-rods arranged to operate valves in duplicate, as 59, 60, having ports, as 51, 54, 52, 55, and arranged to reciprocate over valve-faces having ports, as $h, k$, for the supply or exhaust of the fluid, and ports, as $s, t$, leading to the adjacent cylinder of the pair connected to the same crank-center, each of such cylinders with its tail-rod and valves being arranged to act as valve to the adjacent cylinder of the pair, the angle of advance of each piston with its tail-rod and valves being provided by the disposition of the cylinders in relation to the crank-shaft, the engine being used either with or without the interposition of a controlling-valve, such as $b$, and arranged for the fluid to pass from one cylinder to the other for compound working, the whole substantially as described and as illustrated.

11. A fluid-pressure engine having cylinders placed radially and opposite to each other, as 1, 2, 3, 4, and having their pistons connected in pairs, as 1, 3, and 2, 4, to crank-pins arranged at one hundred and eighty degrees to each other, such pistons being of the same or approximately the same weight for balancing the moving parts and provided with tail-rods arranged to operate valves in duplicate, as 59, 60, having ports, as 51, 54, 52, 55, arranged to reciprocate over valve-faces having ports, as $h, k$, for the supply or exhaust of the fluid, and ports, as $s, t$, leading to the adjacent cylinder of the pair connected to the same crank-center, each of such cylinders and its tail-rod and valves being arranged to act as valve to the adjacent cylinder of the pair, the angle of advance of each piston with its tail-rod and valves being provided by the disposition of the cylinders in relation to the crank-shaft, such engine being arranged for triple-expansion working by reason of the fluid being passed successively through the cylinders, as in the order 1, 2, and concurrently 3, 4, and further such engine being used either with or without the interposition of the controlling-valve, such as $b$, the whole substantially as described and as illustrated.

12. A fluid-pressure engine having six cylinders placed radially and opposite to each other, as 13, 14, 15, 16, 17, 18, and having their pistons connected alternately, as 13, 15, 17, and 14, 16, 18, to two crank-pins arranged at one hundred and eighty degrees to each other, such pistons being of the same or approximately the same weight for balancing the moving parts, and provided with tail-rods arranged to operate valves in duplicate, as 59, 60, having ports, as 51, 54, 52, 55, arranged to reciprocate over valve-faces having ports, as $h, k$, for the supply or exhaust of the fluid, and ports as $s, t$, leading to the adjacent cylinder of the pair connected to the same crank-center, each of such cylinders and its tail-rod and valves being arranged to act as valve to the adjacent cylinder, the angle of advance of each piston with its tail-rod and valves being provided by the disposition of the cylinders in relation to the crank-shaft, such engine being arranged for triple-expansion working with cut-off before the end of the stroke, the fluid being passed and expanded successively through the cylinders, as in the order 13, and concurrently 14, 17, and again concurrently 15, 16, 18; and further such engine being used either with or without the interposition of a controlling-valve, such as $b$, the whole substantially as described and as illustrated.

13. A fluid-pressure engine having cylinders side by side in pairs, as 33, 34, and having their pistons connected to crank-centers arranged at ninety degrees to each other, such pistons being provided with tail-rods operating valves in duplicate, as 59, 60, having ports, as 51, 54, 52, 55, and arranged to reciprocate over valve-faces having ports, as $h, k$, for the supply or exhaust of the fluid, and ports, as $s, t$, leading to the adjacent cylinder, each of such cylinders with its tail-rod and valves being arranged to act as valve to the adjacent cylinder, the angle of advance of each piston with its tail-rod and valves being provided by the pistons being connected to crank-centers arranged at ninety degrees to each other, such engine being arranged for compound working by reason of the fluid being passed from one cylinder to the adjacent cylinder, and further such engine being used either with or without the interposition of a controlling-valve, such as $b$, the whole substantially as described and as illustrated.

14. A fluid-pressure engine having cylinders side by side in pairs, as 33, 34, each pair being opposed by a similar pair, as 35, 36, and each pair having its piston connected to crank-centers at ninety degrees to each other; and the crank-centers being further so disposed that each piston is connected to a crank-center placed at one hundred and eighty degrees to the crank-center of the opposing piston, such opposing piston, as 33, 35, being of the same or approximately the same weight for the purpose of balancing the moving parts; and such pistons being further provided with tail-rods operating valves in duplicate, as 59, 60, having ports, as 51, 54, 52, 55, and arranged to reciprocate over valve-faces having ports, as $h, k$, for the supply or exhaust of fluid, and ports, as $s, t$, leading to the adjacent cylinder, each of such cylinders with its tail-rod and valves being arranged to act as valve to the adjacent cylinder, the angle of advance of each piston with its tail-rod and valves being provided by the pistons being connected to crank-centers arranged at ninety degrees to each other, such engine being arranged for compound working by reason of the fluid being passed from one cylinder to the adjacent cylinder; and further such engine being used either with or without the interposition of a controlling-valve, such as $b$, the whole substantially as described and as illustrated.

15. The use, in combination with the closed-in crank-chamber of an engine in which one cylinder and its piston act as valve to an adjacent cylinder for compound working, of a fan, exhauster or the equivalent, driven direct from the main shaft of the engine and having its suction in communication with the closed-in crank-chamber, such crank-chamber having ventilation-openings, the whole substantially as described and as illustrated.

16. The use, in combination with the closed-in crank-chamber of an engine in which the pistons are provided with tail-rods operating valves in duplicate which control an adjacent cylinder for compound working, of a fan, exhauster or the equivalent, driven direct from the main shaft of the engine and having its suction in communication with the closed-in crank-chamber, such crank-chamber having ventilation-openings, the whole substantially as described and illustrated.

In witness whereof I have hereunto set my hand in presence of two witnesses.

TORBEN CHRISTIAN BILLETOP.

Witnesses:
W. H. GOLDING,
R. W. RIDLEY.